United States Patent
Price (10) Patent No.: US 7,061,723 B2
(45) Date of Patent: Jun. 13, 2006

(54) BILINEAR-NONLINEAR LIMIT STOP FOR HARD DISK DRIVE ACTUATOR

(75) Inventor: Kirk Price, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 243 days.

(21) Appl. No.: 10/722,208

(22) Filed: Nov. 25, 2003

(65) Prior Publication Data

US 2005/0111141 A1   May 26, 2005

(51) Int. Cl.
*G11B 5/55* (2006.01)
(52) U.S. Cl. .................................. 360/265.1
(58) Field of Classification Search .............. 360/265.1
See application file for complete search history.

(56) References Cited

U.S. PATENT DOCUMENTS

| | | | | |
|---|---|---|---|---|
| 5,365,389 A | * | 11/1994 | Jabbari et al. ........... | 360/265.1 |
| 5,402,290 A | * | 3/1995 | Daniel .................... | 360/265.1 |
| 5,612,833 A | | 3/1997 | Yarmchuk et al. | |
| 5,864,449 A | * | 1/1999 | Dominguez et al. ..... | 360/265.1 |
| 5,973,888 A | * | 10/1999 | Chawanya et al. ....... | 360/265.1 |
| 6,011,672 A | * | 1/2000 | Matsumoto .............. | 360/265.1 |
| 6,115,222 A | * | 9/2000 | Andrews et al. ......... | 360/265.1 |
| 6,125,017 A | * | 9/2000 | Misso et al. ............. | 360/265.1 |
| 6,324,034 B1 | * | 11/2001 | Misso et al. ............. | 360/265.1 |
| 6,567,242 B1 | * | 5/2003 | Misso et al. ............. | 360/265.1 |
| 6,826,019 B1 | * | 11/2004 | Misso et al. ............. | 360/265.1 |

* cited by examiner

*Primary Examiner*—Jefferson Evans
(74) *Attorney, Agent, or Firm*—Bracewell & Giuliani LLP (57) ABSTRACT

A hard disk drive limit stop is designed with bilinear-nonlinear properties including a second element between a collar and the actuator. The second element has characteristics that are desired for a self servo write (SSW) start-up process. The limit stop has a crown, such as a cantilever spring, that is mounted to the collar. The stiffness of the crown gives the desired motion under the electrical current applied to the voice coil. The crown is made from material that does not stick to the actuator. Alternatively, the limit stop is used for SSW only, then rotated out of the way so that it is not used during normal operation of the hard disk drive. The SSW limit stop moves out of the way after SSW is complete so that another limit stop may be used during operation.

22 Claims, 5 Drawing Sheets

BILINEAR-NONLINEAR LIMIT STOP FOR HARD DISK DRIVE ACTUATOR

BACKGROUND OF THE INVENTION

1. Technical Field

The present invention relates in general to an improved hard disk drive and, in particular, to an improved apparatus and method of providing a limit stop having both bilinear and nonlinear properties for a hard disk drive actuator.

2. Description of the Related Art

Generally, a data access and storage system consists of one or more storage devices that store data on magnetic or optical storage media. For example, a magnetic storage device is known as a direct access storage device (DASD) or a hard disk drive (HDD) and includes one or more disks and a disk controller to manage local operations concerning the disks. The hard disks themselves are usually made of aluminum alloy or a mixture of glass and ceramic, and are covered with a magnetic coating. Typically, one to six disks are stacked vertically on a common spindle that is turned by a disk drive motor at several thousand revolutions per minute (rpm).

A typical HDD also utilizes an actuator assembly. The actuator moves magnetic read/write heads to the desired location on the rotating disk so as to write information to or read data from that location. Within most HDDs, the magnetic read/write head is mounted on a slider. A slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirably contacting the disk.

Typically, a slider is formed with an aerodynamic pattern of protrusions on its air bearing surface (ABS) that enables the slider to fly at a constant height close to the disk during operation of the disk drive. A slider is associated with each side of each disk and flies just over the disk's surface. Each slider is mounted on a suspension to form a head gimbal assembly (HGA). The HGA is then attached to an actuator arm that supports the entire head flying unit. Several arms may be combined to form a single movable unit having either a linear bearing or a rotary pivotal bearing system.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is therefore substantially proportional to the magnitude of the current. As the read/write head approaches a desired track, a reverse polarity signal is applied to the actuator, causing the signal to act as a brake, and ideally causing the read/write head to stop and settle directly over the desired track.

In hard disk drives, limit stops (LS) are typically used to safely limit the motion of the actuator when it reaches the extreme ends of its stroke. The LS is usually a pin or bumper that is contacted by the arms of the coil yoke of the head-stack assembly (HSA). When the LS is contacted by the yoke arm of the HSA, the kinetic energy of the HSA is converted into strain energy by deforming the LS, and also into heat by virtue of the material damping of the LS. The design of the LS encompasses three main requirements. First, the LS should have good locational accuracy. Second, the LS should have an appropriate stiffness for absorbing the kinetic energy of the HSA in the space that is allotted for limit stop travel. Third, the LS should have high damping so that the velocity of the HSA when leaving the limit stop is as small as possible.

In recent hard disk drives (HDD), there are several common designs for the LS. A typical design uses a molded polymer collar or bumper that is pressed over a pin or peg that is either cast or pressed into the base casting of the HDD. Other LS designs incorporate shapes without a central axis (e.g., rectangular) that are located to the base casting by a pin or hole. These designs provide good locational accuracy and good damping characteristics, according to the damping properties of the polymer selected. Typically, the stiffness versus compression curve for the LS is non-linear, due to both the material properties of the polymer used, and the contact condition between the yoke arm of the HSA and the LS. One detrimental effect of current designs is that the yoke arm may stick to the LS due to the material properties of the polymer.

The advent of Self Servo Write (SSW) has created new demands on LS designs. The SSW process is a procedure that is used to write the servo tracks on the disk without the use of an external encoder, as is typically used in the traditional servo track write process. In brief, the SSW propagates the servo tracks across the disk by servoing on the edge of the previously written track, and then writes the next track.

For example, commonly assigned U.S. Pat. No. 5,612,833 describes one type of SSW system. Head positioning is achieved by first writing a reference track, then moving the head to a next position while reading the reference track until it is determined that the amplitude of the readback signal has been reduced by a predetermined amount. The determination is made on a sector-by-sector basis in a two-step process. First, the signal amplitude of each burst is compared with a corresponding normalization value measured in the same circumferential position of the last written track to obtain a propagation burst fractional amplitude. This current value is then compared to a reference value for the sector, and the difference is used as a position error signal (PES) for making corrections to the head position. The PES is also stored for later use. The normalization values are updated for each newly written track in a normalization revolution. Updating for every track has been performed previously because the propagation burst amplitudes from track to track which provide the normalization values tend to vary due, e.g., to fly height variation and modulation of the magnetic properties of the disk or other causes. New reference values are also calculated for each track during the normalization revolution and incorporate the stored PES values and have the effect of reducing track shape error growth. The new reference values each comprise a nominal reference value plus a corrective value calculated from the previously stored PES for each sector. In addition, the servo loop is designed to have a closed loop response, which causes track shape errors to decay, rather than grow, from one track to the next.

Due to magnetics design considerations and the skew of the read-write head at the extremes of the stroke of the HSA, there is a radial gap between the read and write elements of the slider. Since the SSW process needs to write the new track immediately adjacent to the previous track, the SSW algorithm needs some method to write a number of tracks to span the gap between the read and write elements at the beginning of the process.

One method uses the inner diameter LS (relative to the disks) as part of its start-up algorithm. In order to write the initial tracks, the inner diameter LS is compressed by torque resulting from electrical current applied to the VCM of the HSA. The first track is written, the current is reduced, a second track is written, and so on, until the gap between the read and write elements has been spanned. For this start-up phase, the spacing between the tracks is determined by the stiffness of the LS and the electrical current that is sent to the VCM. It is clear that the non-linear characteristics of the common LS design, which may also depend on temperature, are not suited for this purpose. Furthermore, the materials used for high damping LS often have a sticky surface that makes disengagement of the actuator from the LS quite unpredictable. This condition also causes problems for the SSW process. Thus, an improved design for limit stops in a hard disk drive, particularly those employing the SSW process, would be highly desirable.

SUMMARY OF THE INVENTION

One embodiment of an improved design for hard disk drive limit stops (LS) utilizes a bilinear-nonlinear limit stop. Between the typical polymer nonlinear spring element of the LS and the yoke arm of the head stack assembly, a second element with substantially linear spring characteristics is introduced, which has the characteristics desired for the SSW start-up process. In one embodiment, the LS has one or more "crown" of cantilever beams or spring elements that are interposed parallel to the typical polymer LS, and between it and the yoke arm of the head stack assembly, with a small clearance between the linear spring element and the nonlinear element of the LS.

The stiffness of the interposed spring element is designed to give the desired amount of motion under the electrical current that will be applied to the voice coil during the SSW start-up routine, and the small clearance is selected to give a substantially linear behavior over the distance required for the SSW startup process mentioned above. Since the interposed spring element is made of a hard plastic or metal, the sticking of the actuator to the LS is prevented. If desired, the single spring element can be repeated at intervals around the nonlinear element, so that its orientation relative to the yoke arm is not critical. This design requires more space but does not require an angular orientation feature to place the single spring in the correct position relative to the LS, as is used for a non-axially symmetric base design for the LS.

In another embodiment of the present invention, the interposed linear spring element of the LS is used for SSW only, then rotated out of the way so that it is not used during normal operation of the hard disk drive. An access hole through the cover can be used to rotate the auxiliary LS out of the way after SSW is complete so that the nonlinear element of the LS may be accessed and used during operation. The access hole in the cover may be sealed with a small adhesive label or the like.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
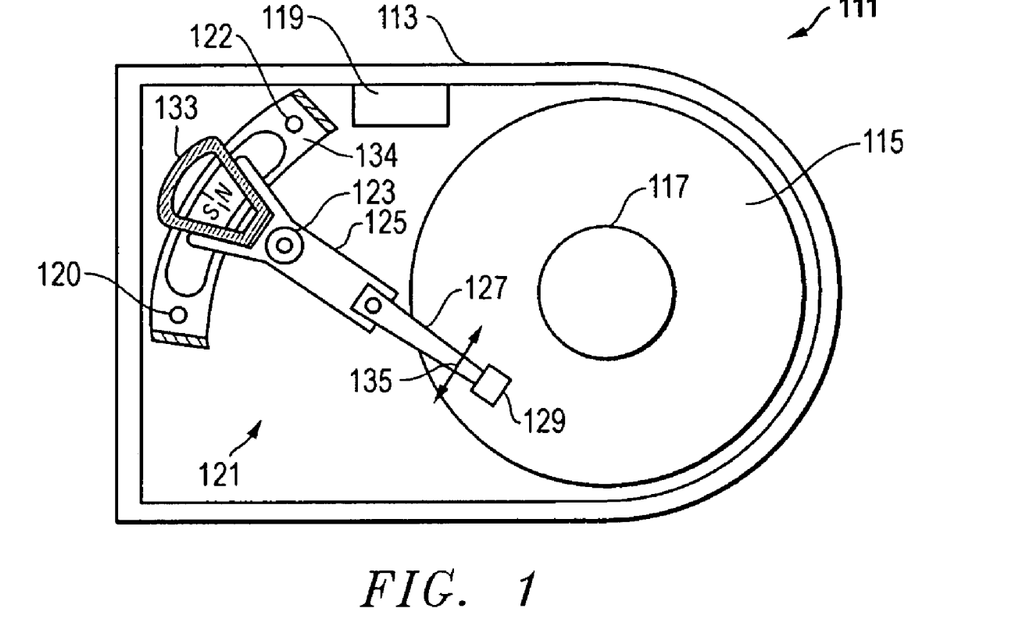
FIG. 1 is a schematic top plan view of hard disk drive constructed in accordance with the present invention.

Referring to FIG. 1, a schematic drawing of an information storage system comprising a magnetic hard disk file or drive 111 constructed in accordance with the present invention is shown. Drive 111 may utilize any of limit stop embodiments of the present invention (described below), either alone or in combination. Drive 111 has an outer housing or base 113 containing at least one magnetic disk 115. Disk 115 is rotated by a spindle motor assembly having a central drive hub 117. An actuator 121 comprises a plurality of parallel actuator arms 125 (one shown) in the form of a comb that is pivotally mounted to base 113 about a pivot assembly 123. A controller 119 is also mounted to base 113 for selectively moving the comb of arms 125 relative to disk 115.

Drive 111 also has an inner diameter crash or limit stop 120, and an outer diameter limit stop 122 for limiting the range of motion of actuator 121 relative to the disk 115. The inner limit stop 120 limits pivotal movement of the actuator 121 in a radially inward direction toward the disk 115, while the outer limit stop 122 limits pivotal movement of the actuator 121 in a radially outward direction away from the disk 115. As mentioned, the inner limit stop 120 may comprise any of the embodiments of the present invention that are described herein.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is head and the slider 129, which are mounted on suspension 127. The slider 129 is usually bonded to the end of suspension 127.

Suspensions 127 have a spring-like quality, which biases or urges the air bearing surface of the slider 129 against the disk 115 to enable the creation of the air bearing film between the slider 129 and disk surface. A voice coil 133 housed within a conventional voice coil motor magnet assembly 134 (top pole not shown) is also mounted to the coil yoke arms 125 opposite the head gimbal assemblies. Movement of the actuator 121 (indicated by arrow 135) by controller 119 moves the head gimbal assemblies radially across tracks on the disk 115 until the heads settle on their respective target tracks. The head gimbal assemblies operate in a conventional manner and always move in unison with one another, unless drive 111 uses multiple independent actuators (not shown) wherein the arms can move independently of one another.

Figure 2:
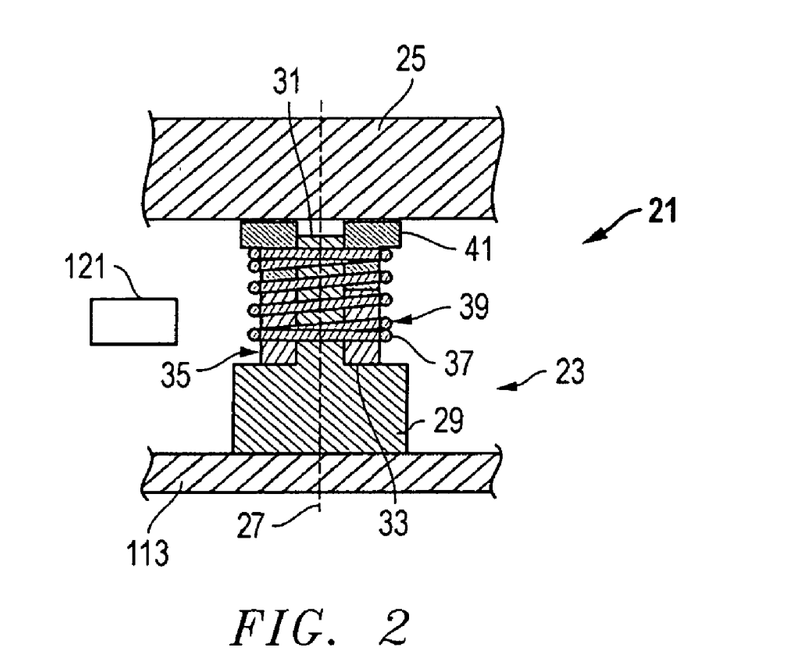
FIG. 2 is a sectional side view of one embodiment of a hard disk drive limit stop constructed in accordance with the present invention.

Referring now to FIG. 2, one embodiment of a limit stop 21 constructed in accordance with the present invention is shown. A cover 25 for the hard disk drive 111 (FIG. 1) is shown as well, and attaches to the base casting of the enclosure 113 for sealing the hard disk drive 111. The limit stop 21 is provided for limiting the pivotal movement of the actuator 121 relative to the disk 115 and the enclosure 113. The limit stop 21 comprises a core 23 having a central axis 27. The core 23 has a base 29 that is mounted to the base casting of the enclosure 113, such as in a hole in the base casting. In one version, the base 29 is cylindrical. A rigid pin 31 extends or protrudes from the base 29 and is coaxially therewith. Alternatively, limit stop 21 may comprise a design that is not axially symmetric.

A collar 33 is mounted to the core 23 and has an exterior 35 that is radially external relative to the core 23. In the embodiment shown, the core 23 is a tubular member that is mounted to the pin 29 and positioned on the base 29, and the exterior 35 is formed from a damping material, such as a molded polymer. An impact member 37 is also mounted to the core 23 and has a radially outer portion 39 that covers at least a portion of the exterior 35 of the collar 33. The outer portion 39 of the impact member 37 forms an initial point of contact for the yoke arm of the actuator 121. At least the outer portion 39 of the impact member 37 is formed from a material that is essentially linear in elastic behavior, and non-adhesive with respect to the yoke arm. In one embodiment, the outer portion 39 is harder than the damping material of the exterior 35 of the collar 33, such that the outer portion 39 (e.g., the outer surface) is non-adhesive.

The collar 33 is designed to provide damping for the actuator 121 after the actuator 121 initially impacts the impact member 37. In the embodiment shown, the impact member 37 is a cylindrical coiled spring that surrounds the collar 33 and is secured to the core 23 with a cap 41. The collar 23 is mounted to the pin 31 and is positioned on the base 29. The cap 41 is mounted to the pin 31 and is positioned on the collar 33. The coiled spring 37 covers at least portions of both the collar 33 and the cap 41, and the base 29, the pin 31, the collar 33, the cap 41, and the coiled spring 37 are all coaxial relative to axis 27.

Figure 14:
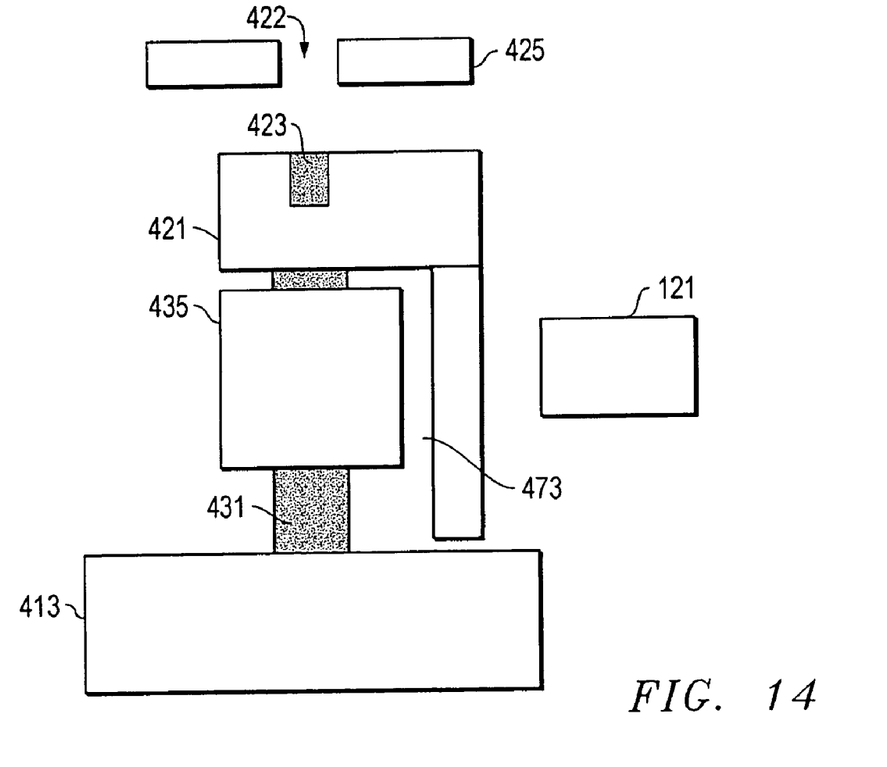
FIG. 14 is a schematic side view of another embodiment of a hard disk drive limit stop constructed in accordance with the present invention.

In one embodiment (FIG. 14), a limit stop 421 comprising a linear spring element on a locating pin 431 is used only during a self servo write process and is movable relative to the enclosure 413. In one version, a slot 423 can be used to rotate the limit stop 421 with a tool (e.g., a screwdriver) that is inserted through a hole 422 in the cover 425, such that it is externally rotatable. The limit stop 421 is not used during normal operations of the hard disk drive 111. In this version, an auxiliary, nonlinear (e.g., polymer) limit stop 435 is used to limit motion of the actuator 121 during normal operations of the hard disk drive 111. A clearance 473 is provided between limit stops 421 and 435.

Referring now to FIGS. 3–6, one alternate embodiment of a limit stop 51 constructed in accordance with the present invention is shown. The limit stop 51 comprises a core 53 that is mounted to the enclosure 113. Core 53 has a central axis 55, a base 57, a pin 59 extending from the base 57, and a slot 61 formed in the pin 59. A collar 63 is mounted to the pin 59 and has an exterior 65 that is radially external relative to the pin 59. The exterior 65 is formed from an elastic damping material, such as molded polymer.

Limit stop 51 also has a spring 67 with a flexible outer portion 69 and a generally cylindrical shape. A mounting portion 71 is connected to the flexible outer portion 69 and is secured in the slot 61 of the pin 59 in a cantilevered configuration. The outer portion 69 surrounds at least a portion of the exterior 65 of the collar 63, such that the outer portion 69 forms an initial point of contact for the actuator 121 during the self servo write process, as described above for the previous embodiment. At least the outer portion 69 of spring 67 is formed from a material that is essentially linear in elastic behavior and non-adhesive. In this way, the collar 63 provides damping for the actuator 121 after the actuator 121 initially impacts the spring 67.

Figure 3:
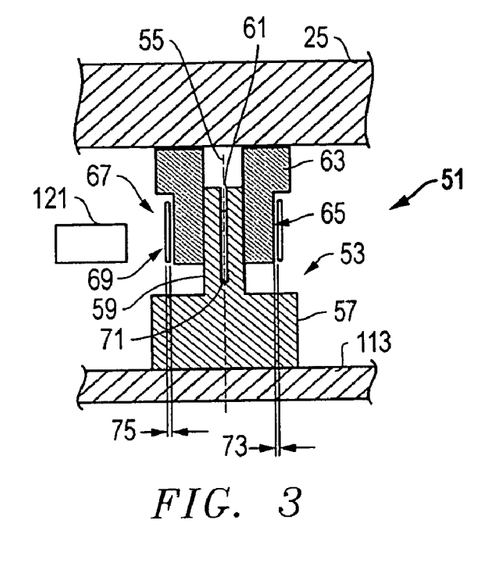
FIG. 3 is a sectional side view of another embodiment of a hard disk drive limit stop constructed in accordance with the present invention.
Figure 4:
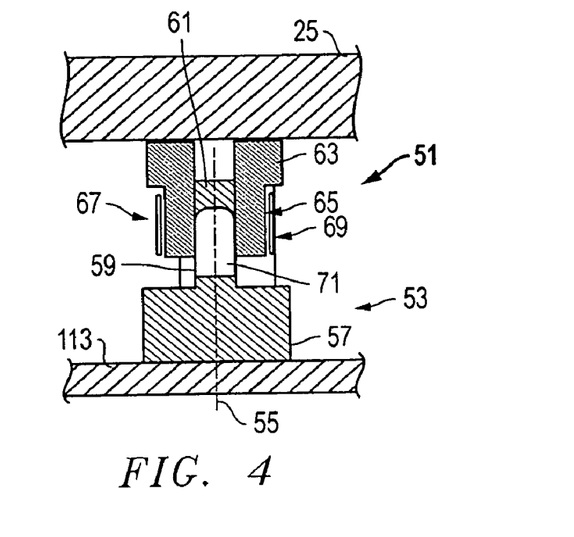
FIG. 4 is an alternate sectional side view of the limit stop of FIG. 3.
Figure 5:
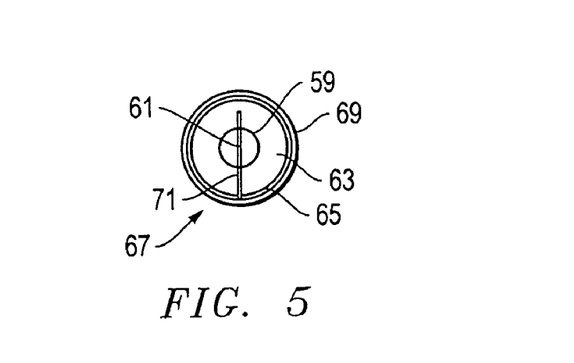
FIG. 5 is a top plan view of the limit stop of FIG. 3.
Figure 6:
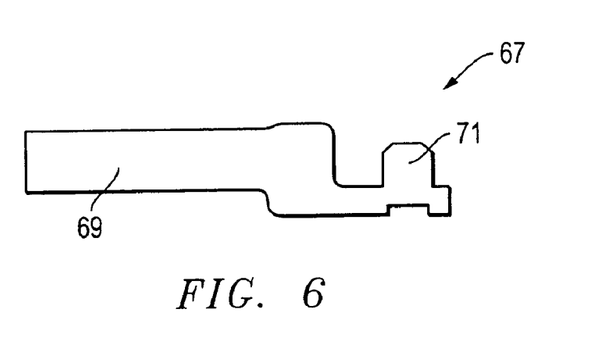
FIG. 6 is a side elevational view of a spring for the limit stop of FIG. 3.
Figure 7:
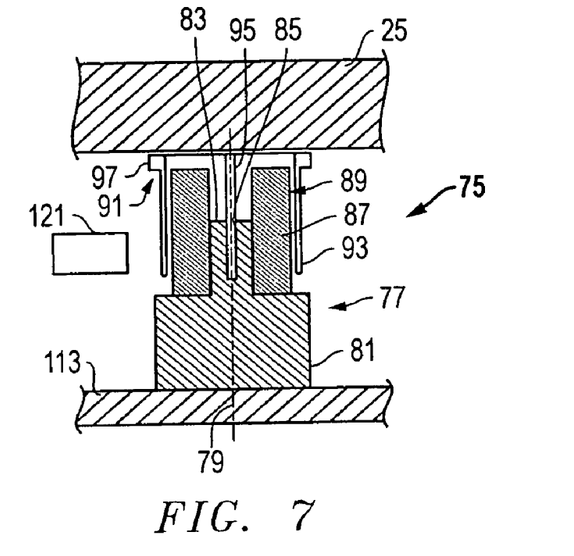
FIG. 7 is a sectional side view of yet another embodiment of a hard disk drive limit stop constructed in accordance with the present invention.
Figure 8:
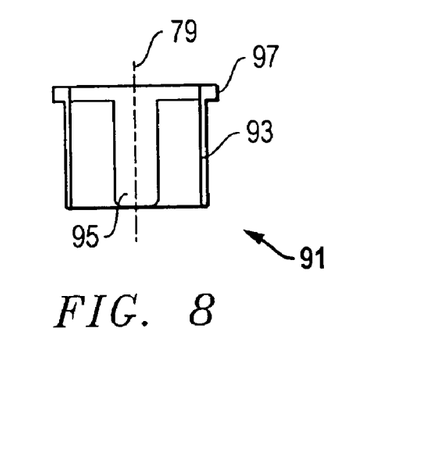
FIG. 8 is a side elevational view of a spring for the limit stop of FIG. 7.
Figure 9:
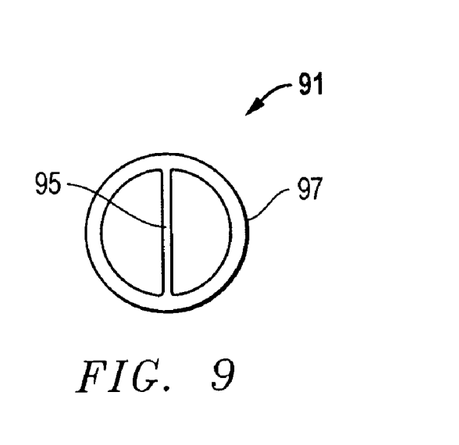
FIG. 9 is a top plan view of the limit stop of FIG. 7.
Figure 10:
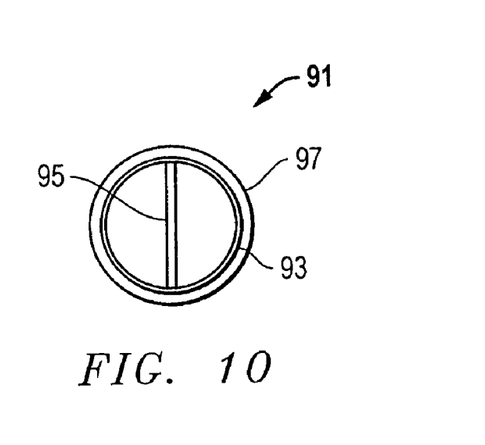
FIG. 10 is a bottom plan view of the limit stop of FIG. 3.

As shown in FIG. 3, one embodiment of the outer portion 69 of the spring 67, which has radial thickness 75 (approximately 0.20 mm), is radially spaced apart from and free of contact with the collar 63 by a distance 73 (approximately 0.20 mm). In one version, spring 67 is a stainless steel flat spring (FIG. 6) formed in a cylindrical shape (FIG. 5) and cantilevered to the core 53. The mounting portion 71 extends from one end of the outer portion 69 such that the spring 67 has a split ring configuration, as shown. In operation, the inner and outer limit stops 120, 122 (FIG. 1) are used only during the self servo write process and are movable relative to the enclosure 113, such that the inner and outer limit stops 120, 122 are not used during normal operations of the hard disk drive 111. This latter embodiment further comprises an auxiliary limit stop such as described above in FIG. 14 that is used to limit motion of the actuator 121 during normal operations of the hard disk drive 111.

Referring now to FIGS. 7–10, another alternate embodiment of a limit stop 75 constructed in accordance with the present invention is shown. The limit stop 75 is most similar to the previous limit stop 51, and comprises a core 77 that is mounted to the enclosure 113. Core 77 has a central axis 79, a base 81, a pin 83 extending from the base 81, and a slot 85 formed in the pin 83. A collar 87 is mounted to the pin 83 and has an exterior 89 that is radially external relative to the pin 83. The exterior 89 is formed from an elastic damping material, such as molded polymer.

Limit stop 75 also has a plastic spring 91 with a flexible outer portion 93 and a generally cylindrical shape. A mounting portion 95 is connected to the flexible outer portion 93 via a rim or crown 97. The crown 97 is mounted to a distal end of the pin 83 of the core 77 via mounting portion 95. More specifically, the mounting portion 95 is secured in the slot 85 of the pin 83 in a cantilevered configuration. The outer portion 93 surrounds at least a portion of the exterior 89 of the collar 87, such that the outer portion 93 forms an initial point of contact for the actuator 121 during the self servo write process, as described above for the previous embodiment. At least the outer portion 93 of spring 91 is formed from a material such as those described above for the previous embodiments. In this way, the collar 87 provides damping for the actuator 121 after the actuator 121 initially impacts the spring 91. Like the previous embodiment, the outer portion 93 may be radially spaced apart from the exterior 89 of the collar 87, as shown.

Figure 11:
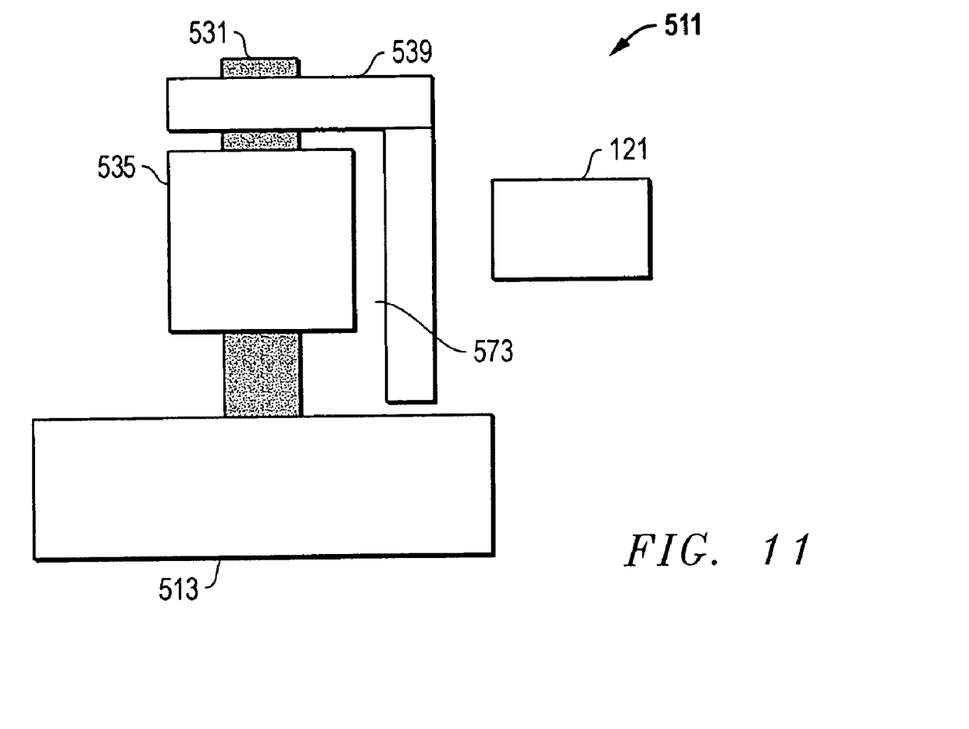
FIG. 11 is a schematic side view of another embodiment of a hard disk drive limit stop constructed in accordance with the present invention.
Figure 12:
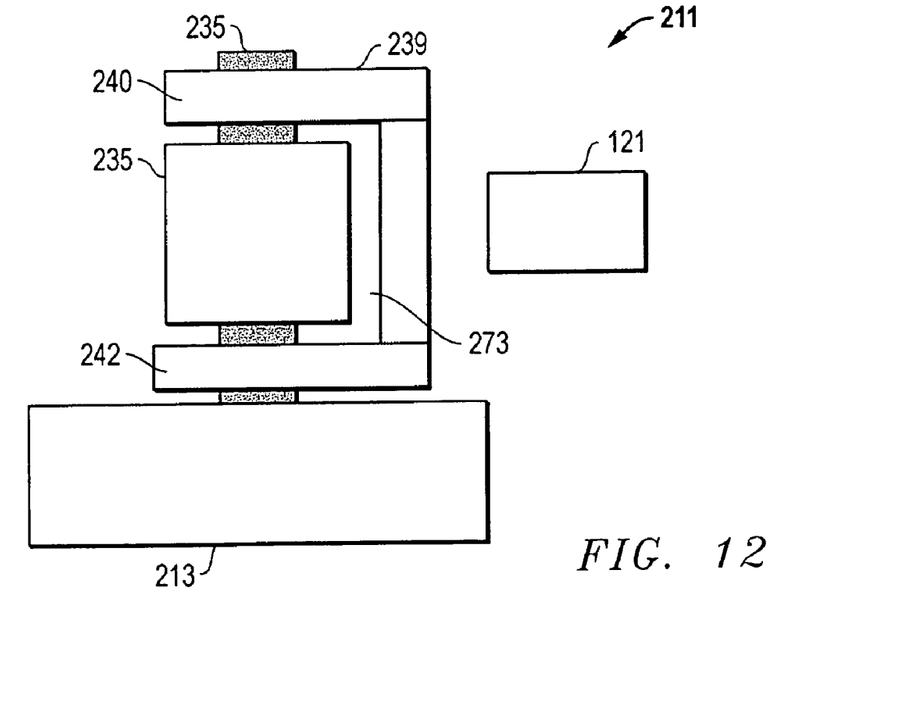
FIG. 12 is a schematic side view of another embodiment of a hard disk drive limit stop constructed in accordance with the present invention.
Figure 13:
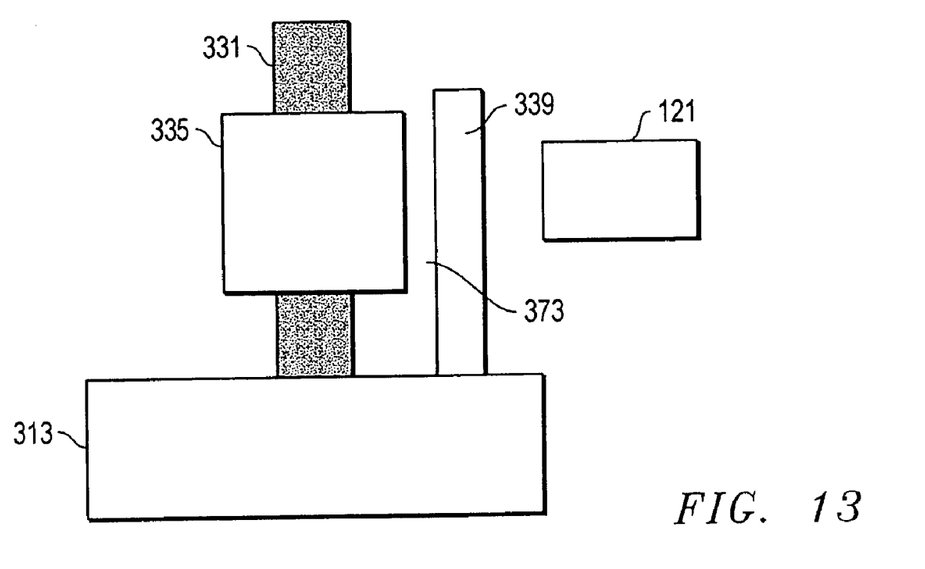
FIG. 13 is a schematic side view of another embodiment of a hard disk drive limit stop constructed in accordance with the present invention.

Referring now to FIG. 11, another embodiment of a limit stop 511 constructed in accordance with the present invention is shown. The limit stop 511 comprises a locating pin 531, a non-linear spring element 535 (e.g., a polymer), and a linear spring element 539, such as those described above. The linear spring element 539 is arranged between the nonlinear element 535 and the yoke arm of the actuator 121, with a clearance 573. Alternately (FIG. 12), the spring element 239 can be supported at both ends 240, 242, or the spring element 339 (FIG. 13) can be supported by the enclosure 313 entirely separate from the supporting pin 331.

The present invention has several advantages. A limit stop constructed in accordance with the present invention safely limits the motion of the actuator when it reaches the extreme ends of its stroke. These limit stops have good locational accuracy, an appropriate stiffness for absorbing the kinetic energy of the actuator in the space that is allotted for limit stop travel, and high damping so that the velocity of the actuator when leaving the limit stop is as small as possible. In addition, the actuator is prevented from sticking to the limit stop due to the material properties of the outer portion of the limit stop to avoid the prior art problems described above in the background section for the SSW process.

A limit stop of the present invention uses a bilinear-nonlinear limit stop with an auxiliary element that has the characteristics desired for the SSW start-up process. The stiffness of the cantilever beams of the present invention is designed to give the desired motion under the electrical current applied to the voice coil. Since the crown is made of a hard plastic or metal, the sticking of the actuator to the limit stop is prevented. Alternatively, the limit stop may be used for SSW only and then rotated out of the way so that it is not used during normal operation of the hard disk drive. A hole in the cover is used to move the SSW limit stop out of the way after SSW is complete so that a conventional limit stop may be accessed and used during operation.

While the invention has been shown or described in only some of its forms, it should be apparent to those skilled in the art that it is not so limited, but is susceptible to various changes without departing from the scope of the invention.

What is claimed is:

1. A hard disk drive, comprising:
   an enclosure;
   a disk mounted to the enclosure and rotatable relative to the enclosure;
   an actuator mounted to the enclosure and movable relative to the enclosure, the actuator having a read/write head for reading data from and writing data to the disk; and
   a limit stop mounted to the enclosure for limiting movement of the actuator relative to the disk; the limit stop further comprising:
   a core mounted to the enclosure;
   a collar mounted to the core and having an exterior that is external relative to the core, and the exterior being formed from a damping material;
   an impact member mounted to the core and having an outer portion that covers at least a portion of the exterior of the collar, such that the outer portion forms an initial point of contact for the actuator, and the outer portion being formed from a material that differs from the damping material of the collar and is essentially linear in elastic behavior; and
   the collar provides damping for the actuator after the actuator initially impacts the impact member.

2. The hard disk drive of claim 1, wherein the impact member is a cylindrical spring.

3. The hard disk drive of claim 1, wherein the core is a rigid pin, the collar is formed from a molded polymer, and the impact member is a cylindrical spring.

4. The hard disk drive of claim 1, wherein the outer portion of the impact member is spaced apart from and free of contact with the collar.

5. The hard disk drive of claim 1, wherein the impact member is a flat spring formed in a cylindrical shape and cantilevered relative to the core.

6. The hard disk drive of claim 1, wherein the impact member is a plastic spring comprising a crown that is mounted to a distal end of the core.

7. The hard disk drive of claim 1, wherein the impact member is a coiled spring that surrounds the collar and is secured to the core with a cap.

8. The hard disk drive of claim 7, wherein the core comprises a base with a pin protruding therefrom, the collar is mounted to the pin and is positioned on the base, the cap is mounted to the pin and is positioned on the collar, the coiled spring covers at least portions of both the collar and the cap, and the base, the pin, the collar, the cap, and the coiled spring are all coaxial relative to each other.

9. The hard disk drive of claim 1, wherein the limit stop is used only during a self servo write process and is movable relative to the enclosure, such that the limit stop is not used during normal operations of the hard disk drive, and further comprising an auxiliary limit stop that is used to limit motion of the actuator during normal operations of the hard disk drive.

10. A hard disk drive, comprising:
    an enclosure;
    a disk mounted to the enclosure and rotatable relative to the enclosure;
    an actuator mounted to the enclosure and pivotable relative to the enclosure, the actuator having a read/write head for reading data from and writing data to the disk during a self servo write process;
    an inner limit stop mounted to the enclosure for limiting pivotal movement of the actuator toward the disk; and
    an outer limit stop mounted to the enclosure for limiting pivotal movement of the actuator away from the disk; each of the inner and outer limit stops further comprising:
    a core mounted to the enclosure and having a central axis, a base, a pin extending from the base, and a slot formed in the pin;

a collar mounted to the pin of the core and having an exterior that is radially external relative to the pin, and the exterior being formed from an elastic damping material;

a spring having a flexible outer portion with a generally cylindrical shape, and a mounting portion connected to the flexible outer portion, the mounting portion being secured in the slot of the pin of the core, the outer portion surrounding at least a portion of the exterior of the collar, such that the outer portion forms an initial point of contact for the actuator during the self servo write process, and the outer portion being formed from a material that is essentially linear in elastic behavior; and the collar provides damping for the actuator after the actuator initially impacts the spring.

11. The hard disk drive of claim 10, wherein the collar is formed from a molded polymer, and the spring is cantilevered to the core.

12. The hard disk drive of claim 10, wherein the outer portion of the spring is radially spaced apart from and free of contact with the collar.

13. The hard disk drive of claim 10, wherein the spring is a stainless steel flat spring formed in a cylindrical shape and cantilevered to the core, and the mounting portion extends from one end of the outer portion such that the spring has a split ring configuration.

14. The bard disk drive of claim 10, wherein the spring is formed from plastic, the mounting portion and the outer portion extend from a crown, and the crown is mounted to a distal end of the pin of the core.

15. The hard disk drive of claim 10, wherein the inner and outer limit stops are used only during the self servo write process and is movable relative to the enclosure, such that the inner and outer limit stops are not used during normal operations of the hard disk drive, and further comprising auxiliary limit stops that are used to limit motion of the actuator during normal operations of the hard disk drive.

16. A hard disk drive, comprising:
an enclosure having a locating pin;
a disk mounted to the enclosure and rotatable relative to the enclosure;
an actuator mounted to the enclosure and movable relative to the enclosure, the actuator having a read/write head for reading data from and writing data to the disk; and
a limit stop mounted to the enclosure for limiting movement of the actuator relative to the disk; the limit stop further comprising:
a nonlinear element mounted to the enclosure via the locating pin;
a linear element mounted to the enclosure located adjacent to the nonlinear element, the linear element being an initial point of contact for the actuator and being formed from a material that differs from a material of the nonlinear element such that the linear element is discontinuous with the nonlinear element.

17. The hard disk drive of claim 16, wherein the linear element is spaced apart from the nonlinear element by a clearance.

18. The hard disk drive of claim 16, wherein the linear element is supported on one end by the locating pin.

19. The hard disk drive of claim 16, wherein the linear element is supported on two ends by the locating pin.

20. The hard disk drive of claim 16, wherein the linear element is mounted directly to the enclosure and is spaced apart from the locating pin.

21. The hard disk drive of claim 16, wherein the linear element is movable relative to the nonlinear element.

22. The hard disk drive of claim 21, wherein the linear element is accessible from an exterior of the enclosure.

* * * * *